Patented Dec. 25, 1934

1,985,490

UNITED STATES PATENT OFFICE 1,985,490

ACIDOPHILUS PRODUCT AND PROCESS OF PRODUCING THE SAME

Stewart M. Farr, Genesee Depot, Wis., assignor to Brook Hill Farm Incorporated, Genesee Depot, Wis., a corporation of Wisconsin No Drawing. Application September 28, 1931, Serial No. 565,701

5 Claims. (Cl. 99—11)

The invention relates to acidophilus products and to methods of producing the same.

B. acidophilus are now recognized as of definite therapeutic value when implanted and allowed to proliferate in the human intestine. Milk in which bacilli acidophilus have been allowed to incubate forming a sour milk product has been used and acidophilus bacilli have also been mixed with sweet milk to form a beverage though they may be mixed with other ingredients other than milk to form beverages. After the production of any of these beverages on a commercial scale as in a laboratory or plant where they may be produced under the most favorable sanitary conditions and under expert supervision the problem of distribution of the finished product arises and in this connection the longevity of the acidophilus bacilli in the product becomes important in order that the product may reach the ultimate consumer while the acidophilus bacilli are in a viable condition. The object of the present invention is to provide certain improvements in the manufacture of acidophilus products or beverages whereby the longevity of the bacilli are assured and in this the invention deals with improvements in the preparation of the so-called acidophilus milk, a sour milk product, in the preparation of sweet acidophilus milk or other beverages containing B. acidophilus.

The invention further consists in the several steps of the process hereinafter set forth and more particularly defined by claims at the conclusion hereof.

In the making of a sour milk product containing bacilli acidophilus it has been proposed to heat the milk, into which the culture is to be introduced, to a sterilizing temperature to completely sterilize the milk. Such a procedure not only requires special tanks and pressure equipment which are not ordinarily possessed by dairies but also has the decided disadvantages of heating the base of the beverage so high that the flavor of the milk thus treated is appreciably affected and imparts a burnt taste to the product. While my work in the production of acidophilus products has shown that it is desirable to render the milk as free of objectionable bacteria in the vegetative stage as possible, and it is thus desirable to heat the milk for this purpose, in the actual production of acidophilus milk, as now being carried out on a commercial scale, the milk has not been heated to a sterilizing temperature and for the reasons above pointed out it is not desirable to do so. However, in the production of acidophilus milk where the milk before incubation has been pasteurized or heated well below a sterilizing temperature it has been found that the longevity of B. acidophilus when allowed to incubate therein is very uncertain and my experiments seem to indicate that a certain amount of heat treatment is necessary not only to destroy undesirable bacteria but to actually change the chemical composition of the milk so as to improve the media in which the bacilli acidophilus may proliferate and in order to bring this about I have found that when the main body of milk is heated to just below boiling and mixed with a small amount of evaporated milk that a suitable base for B. acidophilus is obtained. To particularize, for example, two hundred and seventy gallons of milk is placed in an incubating tank and to this is added thirty gallons of evaporated milk mixture formed of evaporated milk mixed with a sufficient quantity of water so that this mixture has the same composition as whole milk which usually required equal amounts of water and evaporated milk. This evaporated milk mixture constitutes ten percent of the tank contents of which five per cent is evaporated milk. The fat content of this milk mixture may be so adjusted that the final product will contain two percent or any other desired amount. This milk is then heated and agitated or stirred until the temperature is just below the boiling point and is held at this temperature for about one and one half hours. This temperature may be about 210° Fahrenheit when measured at sea level, and correspondingly varied in localities above or below sea level. After this heating step the milk is allowed to cool to about 100° Fahrenheit and inoculated with B. acidophilus. One pint of B. acidophilus culture is used to each one hundred gallons of milk. The contents of the tank are allowed to incubate until the milk attains an acidity of approximately .75% (lactic). It is then cooled to 70° Fahrenheit and bottled. When milk alone has been heated to just below boiling and inoculated with B. acidophilus it has been found that the average number of living B. acidophilus after ten days is far below that of the cultural base produced as outlined above. For example, in tests on ten tanks, without the evaporated milk the average number of living B. acidophilus was fifty-three million after ten days while for the milk prepared with evaporated milk, the average in test on ten tanks was five hundred and fifty-three million living B. acidophilus after ten days. Thus the longevity of B. acidophilus in the milk prepared according to the present process was ten times or one thousand per cent greater than that prepared in the usual manner. While evaporated milk is milk that has been highly heated, the amount of this that is added is so small compared to the total beverage or cultural base that the flavor of the beverage is not impaired.

For making sweet acidophilus milk I proceed in the same manner as making the sour milk product above described except that I prefer to use skim milk to which the evaporated milk is added and heated as before to a temperature slightly below boiling and then allowed to cool to about 100° Fahrenheit and inoculated with B. acidophilus. However, in this instance the incubation is allowed to proceed until the maximum safe acidity is reached. This means an acidity in which the bacteria are not rapidly killed. It varies with different strains of B. acidophilus but the range is generally between 1.2% and 2% (lactic). Thus in this instance I produce acidophilus milk of a higher concentration than that first described. The milk thus produced is not cooled after incubation but is preferably agitated to obtain a smooth and uniform consistency and is then run through a high speed centrifuge at a rate required to separate the milk solids from the whey so that the recovered milk solids will be partially dry and contain for example approximately thirty to sixty per cent moisture and preferably forty per cent moisture. It is found that the recovered milk solids contain essentially all of the bacteria of the milk from which it is obtained, or about ten times the number per gram as the milk. By allowing the milk to incubate to the acidity about set forth it is possible to get a concentration of B. acidophilus in the milk solids between ten and thirty billion per gram. This curd or concentrate is then neutralized to substantially a hydrogen ion concentration of six and eight tenths (6.8) with calcium hydroxide or other suitable alkali.

The bacteria impregnated curd produced as above described is incorporated into sweet milk either by grinding or homogenizing, in proportions to bring the B. acidophilus content of the sweet milk sufficiently high so that it can be used for therapeutic purposes. At the present time it is recognized that the viable B. acidophilus milk should not be below one hundred (100) million per c. c. It then would require ten grams of this concentrate per quart of sweet milk to give a viable count of one hundred to three hundred million per cubic centimeter.

The curd concentrate may be incorporated as above described in beverages other than sweet milk, for example, orange juice or beer.

From the above it will be noted that when making sweet acidophilus milk I use milk as a base in which the culture is allowed to multiply and produce a greater concentration of bacteria therein than in making the sour milk product, yet in each instance this base has the evaporated milk added to it and is heat treated, this evaporated milk when combined with the main body of the milk producing a base which has been found to increase the longevity of the B. acidophilus incubated therein.

I desire it to be understood that this invention is not to be limited to specific details heretofore described except in so far as such limitations are included in the claims.

What I claim as my invention is:

1. The method of preparing an incubating medium for B. acidophilus which consists in adding to the milk in which the B. acidophilus are to be incubated a small amount of evaporated milk and heating this mixture to a temperature slightly below the boiling point, and thereafter cooling the milk thus treated to about 100° Fahrenheit before inoculation.

2. The method of preparing acidophilus milk which consists in adding to the milk base a small amount of evaporated milk, heating and agitating the mixture until the temperature attained is slightly below boiling, holding this temperature for about one and one-half hours, then cooling to about 100° Fahrenheit and inoculating the milk so treated with a suitable culture of B. acidophilus allowing the milk so treated to incubate until an acidity of approximately .75% (lactic) is obtained, cooling the sour milk product thus obtained to about 70° Fahrenheit and placing the product in containers which are thereafter sealed.

3. The method of preparing an incubating medium for B. acidophilus which consists in adding to the milk to be treated about 10% of evaporated milk solution diluted to have substantially the same composition as whole milk, heating and agitating this mixture until the temperature attained is slightly below boiling, maintaining this temperature for about one and one-half hours and then cooling to about 100° Fahrenheit before inoculating with a suitable culture of B. acidophilus.

4. The method of making acidophilus beverages which consists of the steps of the process defined by claim 1, inoculation with B. acidophilus and allowing the incubation to proceed until an acidity of 1.2% to 2% (lactic) is reached, separating the curd from the whey so that the recovered milk solids will be partially dry and contain approximately all the bacteria produced by incubation, neutralizing the curd with a suitable alkali and then incorporating the bacteria impregnated curd in the beverage in proportions to bring the B. acidophilus content thereof sufficiently high so that it can be used for therapeutic purposes.

5. The method of making sweet acidophilus milk which consists of the steps of the process defined by claim 1, inoculation with B. acidophilus and allowing the incubation to proceed until an acidity of 1.2% to 2% (lactic) is reached, agitating the incubated milk to obtain a smooth and uniform consistency, separating the curd from the whey so that the recovered milk solids will be partially dry and contain approximately all the bateria produced by incubation, neutralizing the curd with a suitable alkali, and then incorporating the bacteria impregnated curd into sweet milk in proportions to bring the B. acidophilus content of the sweet milk sufficiently high so that it can be used for therapeutic purposes.

STEWART M. FARR.